United States Patent [19]
Bianchini

[11] Patent Number: 5,984,289
[45] Date of Patent: Nov. 16, 1999

[54] SYSTEM FOR PRECISION CLAMPING MECHANICAL ELEMENTS FOR ASSEMBLY, IN PARTICULAR SHEET METAL PARTS FOR WELDING

[75] Inventor: Giulio Bianchini, Castiglione Torinese, Italy

[73] Assignee: Simpro S.p.A., Italy

[21] Appl. No.: 09/118,082

[22] Filed: Jul. 17, 1998

[30] Foreign Application Priority Data

Jul. 18, 1997 [EP] European Pat. Off. .............. 97830366

[51] Int. Cl.$^6$ ...................................................... B23Q 3/08
[52] U.S. Cl. ............................................................ 269/32
[58] Field of Search .............................. 269/32, 228, 296, 269/221, 236, 229

[56] References Cited

U.S. PATENT DOCUMENTS

| 2,577,029 | 12/1951 | Moorehead . |
| 3,009,694 | 11/1961 | Blatt . |

FOREIGN PATENT DOCUMENTS

| 0216710 | 4/1987 | European Pat. Off. . |
| 2409819 | 6/1979 | France . |
| 1265676 | of 0000 | Germany . |
| 7806055 | 6/1978 | Germany . |
| 9411291 | 3/1994 | Germany . |
| 9416425 | 1/1995 | Germany . |
| 9417667 | 1/1995 | Germany . |
| 29701730 | 4/1997 | Germany . |
| 7901157 | 12/1979 | WIPO . |

OTHER PUBLICATIONS

EPO Search Report, Jan. 2, 1998.

*Primary Examiner*—Robert C. Watson
*Attorney, Agent, or Firm*—Joseph A. Rhoa

[57] ABSTRACT

A modular articulated-lever clamping system having a base flange fittable to a pedestal fitted with a supporting element for supporting sheet metal parts; a control lever operated manually and/or by means of an actuator; a lock lever fittable with a gripping element for gripping the sheet metal parts and cooperating with the supporting element; and a connecting rod connecting the control lever to the lock lever. Respective first ends of the levers are hinged respectively to the base flange by a first and a second hinge element, and the connecting rod is hinged to a transverse appendix of the control lever by a third hinge element; the transverse appendix projects laterally from the control lever towards the lock lever, and is offset with respect to the first hinge element, so that the third hinge element is connected to the control lever in a position which, with respect to the first hinge element, is eccentric both in a direction parallel to the radial extension of the control lever, and at the same time in a direction perpendicular to the aforementioned direction; and the first hinge element is in the form of an eccentric pin for adjusting the center of rotation of the control lever.

17 Claims, 4 Drawing Sheets

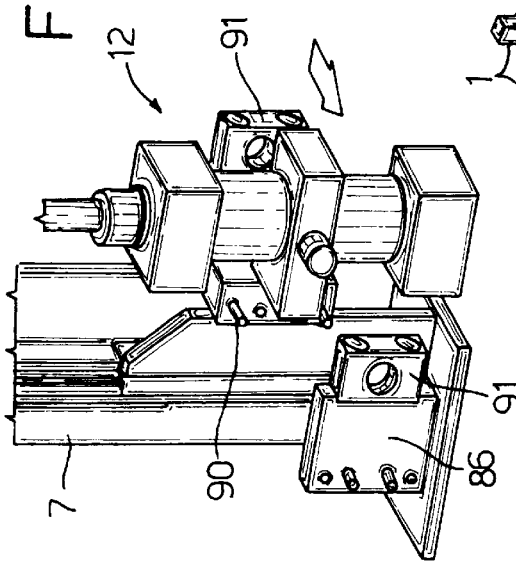
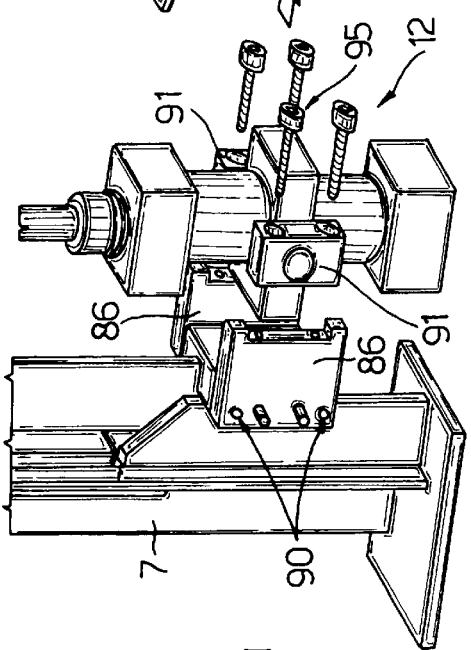
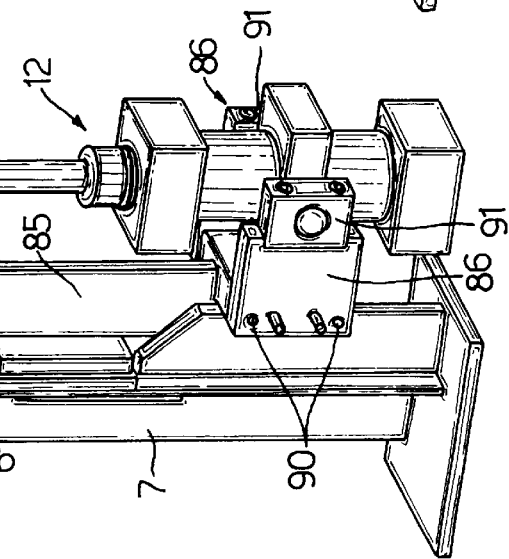
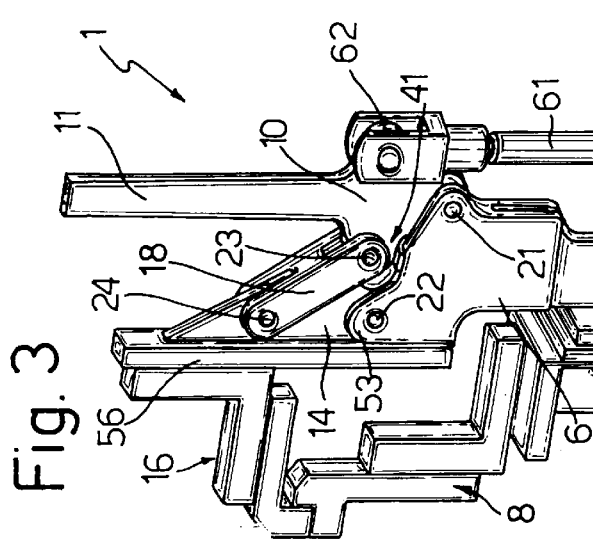

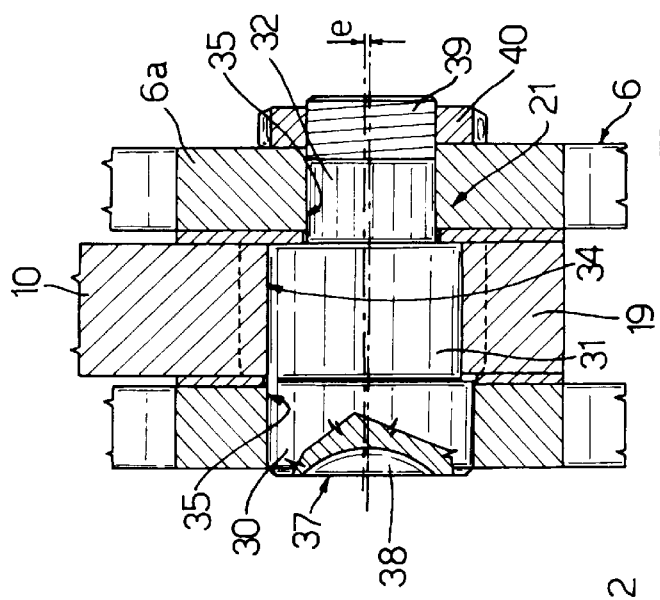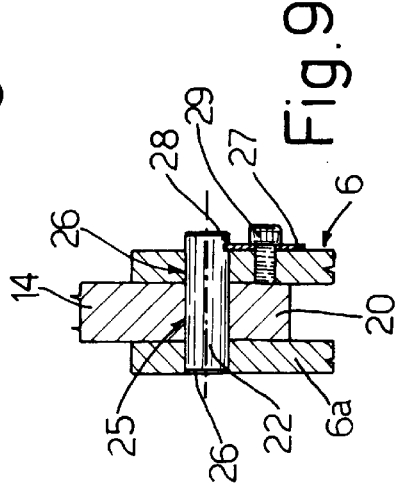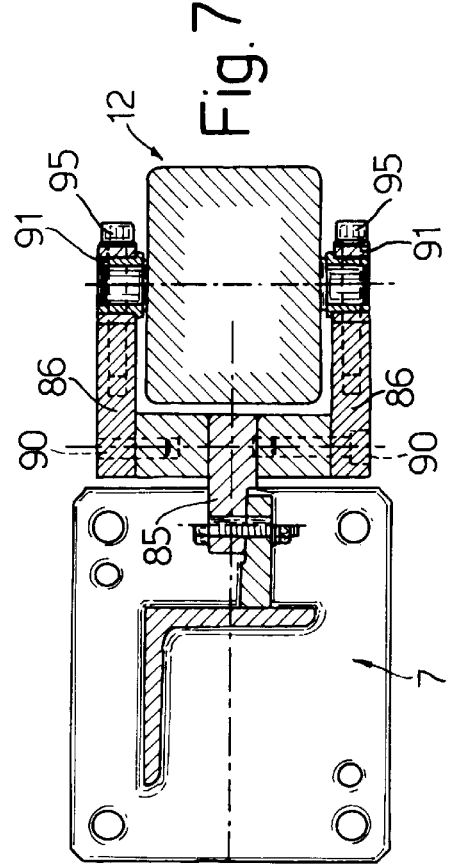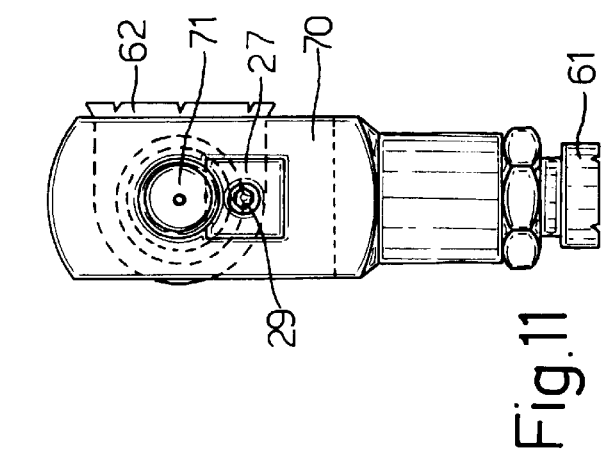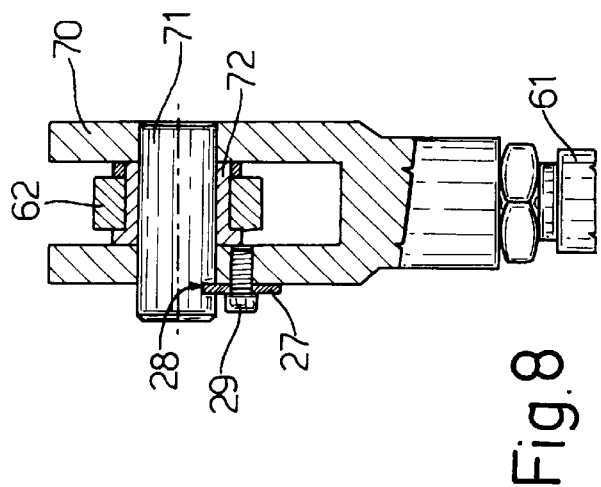

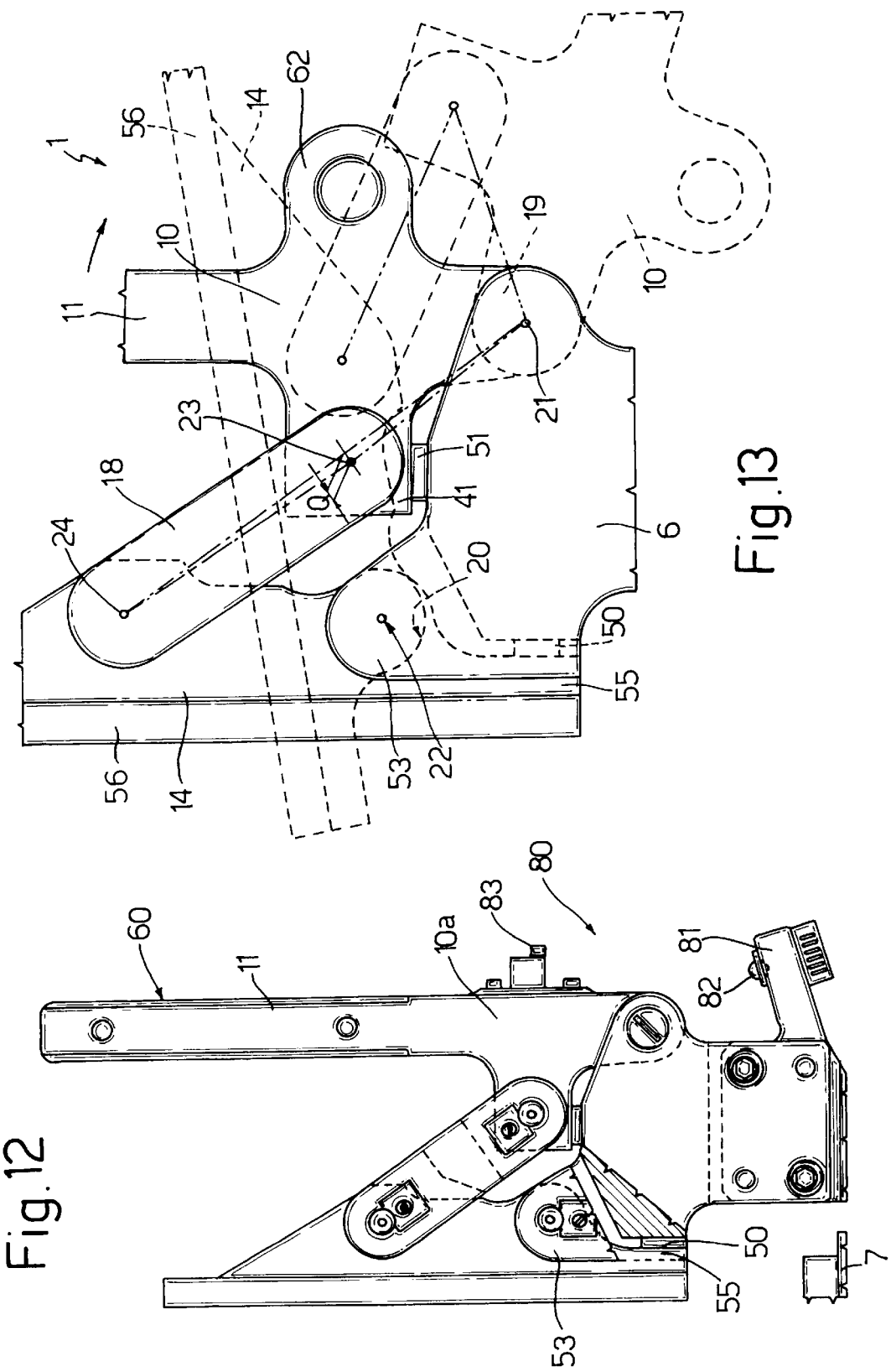

5,984,289

SYSTEM FOR PRECISION CLAMPING MECHANICAL ELEMENTS FOR ASSEMBLY, IN PARTICULAR SHEET METAL PARTS FOR WELDING

BACKGROUND OF THE INVENTION

The present invention relates to a modular, articulated-lever system for precision clamping mechanical elements for assembly, in particular sheet metal parts for welding.

Currently used clamping systems of the above type (known simply as clamps), for holding together sheet metal (e.g. automotive) parts during welding, pose various drawbacks. In particular, currently marketed clamps no longer meet the changed requirements of medium- or large-scale production following the introduction, in both product and tool design, of three-dimensional computer-assisted, as opposed to physical, models. Such clamps, in fact, are basically weak and of negligible cost as compared with the blocks required to form complete clamping assemblies, so that any saving from the use of commercial clamps, as compared with the cost of a specially designed tool, is more than made up for by increased accessory costs.

Moreover, known commercial clamps are unreliable, due to failure to withstand lateral loads, and the fact that no provision whatsoever is made to ensure correct retention of the sheet metal parts, thus resulting in poor quality of the finished product. Both these disadvantages are also a consequence of known clamps not originally featuring flat surfaces on which to fix and support the numerically controlled milled blocks, which surfaces are welded on and machined later, with fairly poor results in terms of accuracy. Finally, known clamps easily work loose, and therefore require frequent adjustment involving stoppage of the production line.

SUMMARY OF THE INVENTION

It is an object of the present invention to overcome the above drawbacks, and in particular to provide a clamp of the type described, designed to constitute a modular system for precision clamping sheet metal parts for welding and, more generally, any mechanical element which must be retained during assembly. More specifically, it is an object of the present invention to provide a clamping system of the above type, which is strong, is cheap to produce and maintain, is compact—more specifically, is of an overall transverse size roughly equal to the center distance (about 50 mm) of standard industrial welding guns, to enable the formation of two adjacent weld spots, one on either side of the sheet metal parts retained by each clamp—is versatile, is adaptable to mechanical elements/components of different types, shapes and sizes, is subject to very little wear-induced slack, and, at any rate, provides for fast, troublefree slack takeup.

According to the present invention, there is provided a clamping system for precision clamping mechanical elements for assembly, in particular sheet metal parts for welding; said clamping system being a modular, articulated-lever type, and comprising a base flange fittable to a pedestal in turn fittable with a supporting element for supporting said mechanical elements for assembly; a control lever; actuating means for activating the control lever; a lock lever fittable with a gripping element cooperating with said supporting element to grip, against said supporting element, said mechanical elements for assembly; and a connecting rod connecting the control lever to the lock lever; respective first ends of said levers being hinged to the base flange by a first and second hinge element respectively; characterized in that said connecting rod is hinged to said control lever by a third hinge element connected to the control lever in a position which, with respect to the first hinge element, is eccentric both in a direction parallel to the radial extension of said control lever, and at the same time in a direction perpendicular to the aforementioned direction.

More specifically, the base flange comprises a first and a second flat stop surface strictly perpendicular to each other, and a pair of lateral stop guides for arresting the lock lever and between which the first stop surface is located; and said first hinge element comprises an eccentric pin fitted to the base flange and selectively lockable in a number of different angular positions to adjust the center of rotation of the control lever.

The present invention therefore provides for: precise, reliable movement and positioning of the lock lever; contrasting lateral loads, which therefore no longer bear on the articulated levers of the clamp; precise location of the open and closed limit positions of the lock lever and the system as a whole; highly straightforward design and fairly low-cost manufacture; fast, troublefree slack takeup; and above all the possibility of adjusting as required and adapting the "click-on" closing phase of the system to the control system adopted in each case (manual, pneumatic or hydraulic actuators, etc.).

BRIEF DESCRIPTION OF THE DRAWINGS

A number of non-limiting embodiments of the present invention will be described by way of example with reference to the accompanying drawings, in which:

FIGS. 3, 4, 5 show schematic views in perspective of the FIG. 1 clamping system, and larger-scale views of a number of component parts;

FIG. 6 shows a smaller-scale schematic view of a retaining tool defined by a number of clamping systems according to the present invention, and for retaining sheet metal parts from which to form an automotive component (rear door);

FIGS. 7 to 10 show respective sections along lines VII—VII to X—X in FIG. 1;

FIGS. 11 and 12 show respective larger-scale details of the FIG. 1 clamping system and a possible variation;

FIG. 13 shows a larger-scale diagram of the mechanism of the clamping system according to the present invention.

DETAILED DESCRIPTION OF THE INVENTION

Figure 1:
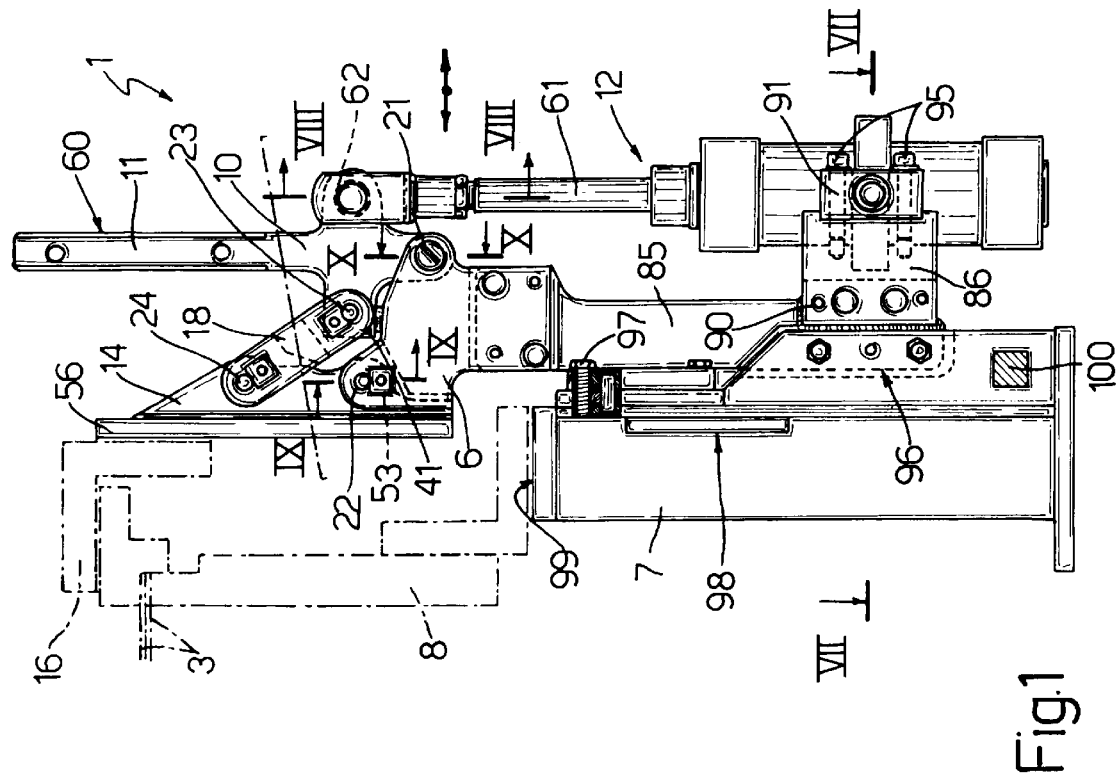
FIG. 1 shows a side view of the basic components of a modular, articulated-lever clamping system in accordance with the present invention, and as applied, for example, for retaining metal sheets/sheet metal parts for welding.

With reference to FIGS. 1, 3–10 and 13, number 1 indicates a system for precision clamping mechanical elements for assembly—in the example shown, for forming complete tools 2 (FIG. 6) for supporting and retaining metal sheets/sheet metal parts 3 from which to produce, when electrically spot welded for example, automotive components 4, such as the rear door or side door of a vehicle. As will become clear in the following description, clamping system 1 is also capable of retaining any other type of mechanical element/component for any other purpose, and may therefore be used outside the automotive industry, e.g. for assembling household appliances.

As will be seen, clamping system 1 is highly modular with a large number of similar or identical interchangeable components from which to form different variations, and substantially comprises a number of levers so articulated as to ensure irreversibility of the mechanism as a whole. More specifically, clamping system 1 according to the invention comprises a base flange 6 fittable to a pedestal 7 in turn fittable with a known supporting element 8, e.g. a square, of any form and for supporting/receiving sheets 3; a control lever 10; actuating means 11, 12 for activating control lever 10; a lock lever 14 fittable with a known gripping element 16 cooperating in use with supporting element 8 to grip sheets 3 against supporting element 8; and a connecting rod 18 connecting control lever 10 to lock lever 14.

Base flange 6 may either be formed in one machined piece, or assembled from shaped riveted sheet metal. Whichever the case, flange 6 is substantially fork-shaped, at least at a portion 6a facing away from pedestal 7, and is hinged, inside fork-shaped portion 6a, to respective first ends 19, 20 (FIG. 13) of levers 10 and 14. More specifically, levers 10, 14 are hinged respectively to flange 6 by a first and a second hinge element comprising respective cylindrical pins 21 and 22 (shown schematically in FIG. 13 by the respective rotation or hinge axes or centers); and connecting rod 18 is hinged at opposite ends to control lever 10 by a third hinge element comprising a cylindrical pin 23, and to lock lever 14 by a fourth hinge element comprising a cylindrical pin 24.

Pins 21, 22, 23, 24 are all parallel, and define the hinge and rotation axes of levers 10, 14, connecting rod 18, and flange 6. More specifically (FIGS. 9 and 10), pins 21 and 22 are fitted transversely through fork-shaped portion 6a of flange 6, perpendicular to the plane of portion 6a (coincident with the FIGS. 9 and 10 plane), i.e. parallel to the thickness of flange 6. Pin 22 idly engages a transverse hole 25 formed perpendicularly through end 20 of lever 14, is driven through two facing, coaxial holes 26 formed transversely through fork-shaped portion 6a of flange 6, and is locked axially and angularly inside holes 26 by a prismatic (square) plate 27, which engages a tangential groove 28 on one end of pin 22 projecting from one face of flange 6, and is locked in position against the same face of flange 6 by a screw 29. Pins 23 and 24 are also inserted and locked similarly (not shown for the sake of simplicity) through levers 10 and 14 (idle) and through opposite ends of connecting rod 18, which are fork-shaped (FIG. 3) in the same way as portion 6a of flange 6.

Pin 21, on the other hand, is an eccentric, as opposed to a normal cylindrical, pin, which is fitted to base flange 6 and selectively lockable in a number of different angular positions to adjust, as will be seen, the center of rotation of control lever 10. More specifically, eccentric pin 21 comprises a first, second and third cylindrical body 30, 31, 32 arranged in sequence; cylindrical body 31 is located between cylindrical bodies 30 and 32, which are coaxial with each other, is eccentric with respect to cylindrical bodies 30 and 32 by a given distance (e), and idly engages a respective transverse through hole 34 formed perpendicularly through end 19 of control lever 10; and cylindrical bodies 30 and 32 are fitted idly through respective facing transverse holes 35 formed through fork-shaped portion 6a of base flange 6. In the example shown, body 30 comprises an adjusting head 37 having angular adjusting means defined by a half-moon-shaped slot 38 engageable by a screwdriver, coin or any other suitable means by which to manually torque pin 21; the opposite body 32 comprises a threaded end 39 projecting laterally from an outer side of base flange 6; and end 39 is fitted with a ring nut 40, which is screwed down against said outer side of flange 6.

According to the present invention (FIG. 13), pin 23 is connected to control lever 10 in a position which, with respect to pin 21 (in this case, with respect to the axis of bodies 30, 32), is eccentric both in a direction parallel to the radial extension (with respect to pin 21) of control lever 10, and at the same time in a direction perpendicular to the aforementioned direction. In actual use, therefore, clamping system 1 may selectively assume two limit positions: a closed position shown in FIGS. 1 and 3 and by the continuous line in FIG. 13; and an open position shown by the dash line in FIG. 13 and, only as regards the profile of lever 14, by the dot-and-dash line in FIG. 1.

In the open position, lever 14 is rotated into a withdrawn position towards pin 21, so as to part elements 8 and 16 and permit the mechanical elements (sheets 3) for retention to be placed on element 8. Conversely, in the closed position, lever 14 is set to a limit position wherein elements 8 and 16 cooperate with each other to grip and retain sheets 3 with a predetermined gripping pressure, and so permit any operation (e.g. welding) to be performed on sheets 3 locked in a predetermined position.

Also according to the present invention, pin 21 is connected to base flange 6 in such a position that, when system 1 is closed, pin 23, with respect to a theoretical line joining pins 21 and 24 and shown by the dot-and-dash line in FIG. 13, is offset slightly towards pin 22 by a very small predetermined distance (roughly 4–6 tenths of a millimeter) indicated by Q in FIG. 13, so that, when closing the system, pin 23 reaches the unstable position of perfect alignment with the line joining pins 21 and 24 before system 1 reaches the set limit position.

This ensures the irreversibility of system 1. That is, on reaching the perfectly aligned position, pin 23 continues moving to "click" levers 10, 14 and connecting rod 18 into the closed position, which, by virtue of offset Q of pin 23 with respect to pins 21, 24, is a kinematically stable position in which any force applied to lever 14 so torques pin 23 as to close and so prevent accidental release of system 1. The movement of system 1 may only be inverted, and hence system 1 released, by so torquing lever 10 as to rotate it in the direction of the arrow in FIG. 13 and overcome the resisting torque of pin 23.

By virtue of the mechanism described and the relative positions of pins 21, 22, 23, the amount of offset Q—which is what determines the way in which system 1 "clicks" open and shut (more or less sharply)—and the load applied to lever 10 to effect such clicking action, therefore depend exclusively, according to the invention, on the position of the center of rotation of lever 10 about pin 21 with respect to the center of rotation of pin 22; which position, using an eccentric pin 21 such as the one described, may be adjusted as required within a wide range (as compared with the mean value of Q) by simply unscrewing ring nut 40 to release pin 21 so that bodies 30, 32 rotate with respect to flange 6, and then rotating pin 21 by the required angle to rotate eccentric central body 31 and so move, in the direction of the arrows in FIG. 1, the center of rotation of lever 10 with respect to pin 22, which remains a fixed point.

The present invention therefore ensures, firstly, the existence of a fixed point (pin 22) of system 1, which may be used as a virtual reference position for solid modeling CAD programs, for designing both individual systems 1 and tool 2 as a whole, solely on the basis of the CAD project of component 4 being produced. Secondly, the "clicking" action of system 1 may be adjusted easily and as required by means of eccentric pin 21, to adapt the same system 1, even afterwards, to different actuating means. Finally, any wear-induced slack eventually forming in system 1 may be taken up by so acting on eccentric pin 21 as to move the center of rotation of lever 10 away from pin 22.

According to a variation, not shown for the sake of simplicity, pin 21 is connected to base flange 6 in such a position that, when system 1 is closed, pin 23 is still offset slightly by a very small predetermined amount with respect to the theoretical line joining pins 21 and 24, but on the opposite side to pin 22, so that system 1 is reversible, and the closed position defined above is kinematically unstable. This solution is therefore only indicated when control lever 10 is activated, not manually, but by means of an actuator (as described in detail later on) capable, when not activated, of preventing accidental release of the system.

Whichever the case, according to the preferred embodiment of the present invention, the particular location of pin 23 with respect to pin 21 is achieved by forming control lever 10 with a transverse appendix 41 projecting laterally towards the lock lever and offset (i.e. in a different longitudinal position) with respect to pin 21, on the opposite side with respect to end 19 of control lever 10; and by hinging connecting rod 18 to control lever 10 by means of transverse appendix 41, which is fitted through with pin 23.

With reference to FIG. 13, base flange 6 comprises two flat stop surfaces 50 and 51 (preferably machined in one piece from flange 6) strictly perpendicular to each other so that, in the closed position, lock lever 14 contacts surface 50 facing sheets 3 in use, and control lever 10—more specifically appendix 41—simultaneously contacts surface 51. This provides, unlike known clamping systems, for taking up, as described, any wear-induced slack in system 1, while at the same time maintaining lever 14 strictly perpendicular to the clamped elements (sheets 3).

According to a further aspect of the present invention, base flange 6 comprises a pair of lateral stop guides 53 for arresting lock lever 14 and defined by the facing lateral walls of fork-shaped portion 6a; and stop surface 50 on flange 6 is formed between guides 53. Lock lever 14 is therefore hinged to base flange 6 between guides 53, which are fitted through perpendicularly with pin 22; and lever 14 also comprises a stop appendix 55 extending so as to be inserted fully between guides 53 in the closed position, and to rest against surface 50 of base flange 6.

Lock lever 14 preferably comprises a rail 56 parallel to stop appendix 55, facing sheets 3 in use, and along which gripping element 16 is fittable selectively in known manner, e.g. by means of screws (FIGS. 1 and 2), in a number of different positions to quickly and easily adapt the same system 1 to sheets 3 differing even widely in shape, size and configuration.

The actuating means for activating control lever 10 may comprise, jointly, a straight extension 11 of lever 10, extending beyond the hinge point of lever 10 and connecting rod 18 and possibly comprising a handgrip 60 enabling lever 10 to be opened and closed manually; and a linear actuator 12 integral with base flange 6, and the movable element 61 of which is hinged to control lever 10 by a second transverse appendix 62 of lever 10, located substantially symmetrically and specularly with respect to appendix 41 securing connecting rod 18, so that lever 10 may also be power operated by means of appropriate known automatic devices.

Figure 2:
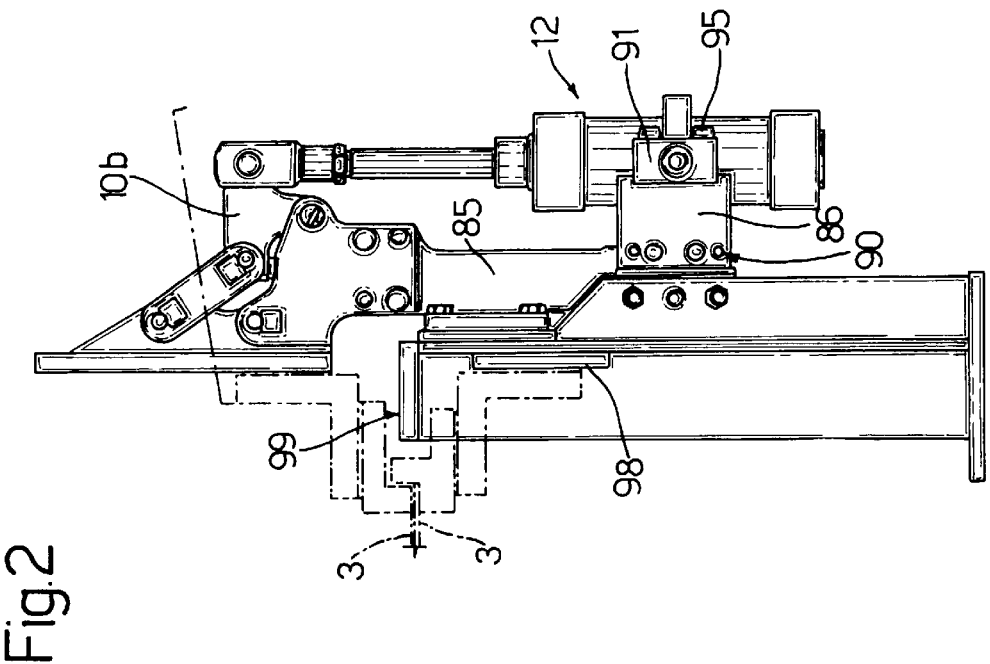
FIG. 2 shows the same side view of a variation of the system according to the invention, comprising substantially the same components, and as applied for retaining sheet metal parts positioned differently as compared to FIG. 1.

According to the variations shown in FIGS. 2 and 12—in which any parts similar or identical to those already described are indicated using the same numbering system—system 1 may comprise an exclusively manually controlled lever 10a (FIG. 12) without appendix 62, in which case, actuator 12 is dispensed with; or an exclusively automatically controlled lever 10b (FIG. 2) without extension 11. Whichever the case, eccentric pin 21 provides for adapting the same system 1 to different actuating means, and for using identical components for the FIGS. 2 and 12 variations, by simply substituting lever 10a or 10b for lever 10.

If actuator 12 is used, the rod 61 of actuator 12 terminates with a fork-shaped head 70 (FIGS. 8 and 11) in which appendix 62 is hinged by means of a through pin 71 and a frictionless bush 72 fitted to pin 71, which, like pins 22, 23, 24, is locked axially and angularly by a plate 27 and a screw 29.

Particularly when operated manually, system 1 may comprise a stop device 80 (FIG. 12) for clicking and locking control lever 10 in the open position when system 1 is assembled in opposition to gravitational force. Device 80 comprises a bracket 81 fitted to base flange 6 and having a spherical pin 82 retractable in opposition to elastic means (not shown); and an adjustable projecting element 83 fitted to control lever 10 and which clicks onto pin 82 when lever 10 is in the fully open position.

With reference to FIGS. 3, 4, 5 and 7, actuator 12 is preferably fitted integrally to flange 6 on a supporting foot 85 also integral with flange 6, e.g. formed in one piece with or, preferably, screwed to it; actuator 12 pivots between two facing brackets 86 fitted to either side of foot 85, and at least one of which is fitted to foot 85 in easily removable manner, e.g. by means of screws 90; and actuator 12 pivots between two plates 91, each fitted to the front of a respective bracket 86 in easily removable manner, e.g. by means of screws 95.

For maintenance purposes, therefore, actuator 12 may be removed laterally by removing one of brackets 86 (FIG. 4), or frontwards by removing both plates 91 (FIG. 5). In the same way and using the same components, actuator 12 may obviously also be fitted directly to pedestal 7, if this also forms part of system 1, and not of tool 2 or the user system.

In which case, pedestal 7 comprises assembly holes 96 (FIG. 1); flange 6 is fitted in easily removable manner, e.g. by means of screws 97 (FIG. 1), to pedestal 7 by means of supporting foot 85; and pedestal 7 comprises a first and second flat connecting surface 98, 99 strictly perpendicular to each other and for selectively receiving supporting element 8 (FIGS. 1 and 2). Finally, if actuator 12 is provided, pedestal 7 may be fitted laterally with known microswitches 100 (shown schematically) for detecting the position of movable element (rod) 61 of actuator 12, e.g. by means of known forks (not shown) fitted to the rod.

I claim:

1. A clamping system (1) for precision clamping mechanical elements (3) for assembly, in particular sheet metal parts for welding; said clamping system (1) being a modular, articulated-lever type, and comprising a base flange (6) fittable to a pedestal (7) in turn fittable with a supporting element (8) for supporting said mechanical elements (3) for assembly; a control lever (10); actuating means (11, 12) for activating the control lever (10); a lock lever (14) fittable with a gripping element (16) cooperating with said supporting element (8) to grip, against said supporting element, said mechanical elements (3) for assembly; and a connecting rod (18) connecting the control lever (10) to the lock lever (14); respective first ends (19, 20) of said levers (10, 14) being hinged to the base flange (6) by a first (21) and second (22) hinge element respectively; characterized in that said connecting rod (18) is hinged to said control lever (10) by a third hinge element (23) connected to the control lever (10) in a position which, with respect to the first hinge element (21), is eccentric both in a direction parallel to the radial extension of said control lever (10), and at the same time in a direct perpendicular to the aforementioned direction.

2. A clamping system as claimed in claim 1, characterized in that said base flange (6) comprises two flat stop surfaces (50, 51) strictly perpendicular to each other; said clamping system (1) selectively assuming a closed position and an open position; and, in said closed position, said lock lever (14) cooperating with a first (50) of said stop surfaces, positioned in use facing said elements (3) for assembly, and said control lever (10) cooperating with a second (51) of said stop surfaces.

3. A clamping system as claimed in claim 2, characterized in that said control lever (10) comprises a transverse appendix (41) projecting laterally from the control lever towards the lock lever (14), and offset with respect to the first hinge element (21), on the opposite side with respect to said first end (19) of the control lever (10), so that, in said closed position, said appendix (41) rests against said second stop surface (51) of the base flange (6); said connecting rod (18) being hinged to the control lever (10) by means of said transverse appendix (41), which is fitted with said third hinge element (23).

4. A clamping system as claimed in claim 3, characterized in that said base flange (6) comprises a pair of lateral stop guides (53) for arresting the lock lever (14) and between which said first stop surface (50) is located; the lock lever (14) being hinged to the base flange (6) between said guides (53), which are fitted through perpendicularly with said second hinge element (22), and comprising a stop appendix (55) extending so as to be inserted between said guides (53), in said closed position, and to rest against said first stop surface (50) of the base flange (6).

5. A clamping system as claimed in claim 4, characterized in that said lock lever (14) comprises a rail (56) parallel to said stop appendix (55), positioned, in use, facing the elements (3) for assembly, and along which said gripping element (16) is fittable selectively in a number of different positions.

6. A clamping system as claimed in claim 4, characterized by comprising a fourth hinge element (24) whereby the connecting rod (18) is hinged to the lock lever (14); said first hinge element (21) being connected to said base flange (6) in such a position that, in said closed position, said third hinge element (23), with respect to a theoretical line joining said first (21) and fourth (24) hinge elements, is offset slightly by a very small predetermined amount (Q) towards said second hinge element (22).

7. A clamping system as claimed in claim 4, characterized by comprising a fourth hinge element (24) whereby the connecting rod (18) is hinged to the lock lever (14); said first hinge element (21) being connected to said base flange (6) in such a position that, in said closed position, said third hinge element (23), with respect to a theoretical line joining said first (21) and fourth (24) hinge elements, is offset slightly by a very small predetermined amount (Q) on the opposite side to said second hinge element (22).

8. A clamping system as claimed in claim 6, characterized in that said first hinge element (21) comprises an eccentric pin fitted to the base flange (6) and selectively lockable in a number of different angular positions to adjust the center of rotation of the control lever (10) and, hence, said predetermined amount (Q) by which said third hinge element (23) is offset, with respect to said theoretical line, towards or on the opposite side to the second hinge element (22).

9. A clamping system as claimed in claim 8, characterized in that said eccentric pin (21) comprises a first (30), a second (31), and a third (32) cylindrical body arranged in sequence; the second cylindrical body (31) being located between, and being offset by a predetermined distance (e) with respect to, the first (30) and third (32) cylindrical bodies, which are coaxial with each other; the second cylindrical body (31) idly engaging a respective transverse hole (34) through the first end (19) of the control lever (10); said first (30) and third (32) cylindrical bodies being fitted idly through respective facing transverse holes (35) through the base flange (6); one of said first (30) and third (32) cylindrical bodies comprising an adjusting head (37) having angular adjusting means (38), and the other comprising a threaded end (39) fitted with a ring nut (40) which is screwed down against said base flange (6).

10. A clamping system as claimed in claim 1, characterized in that said actuating means for activating the control lever (10) comprise a straight extension (11) of the control lever (10) beyond the hinge point of the control lever and the connecting rod (18); said extension (11) comprising a handgrip (60).

11. A clamping system as claimed in claim 10, characterized by also comprising a stop device (80) for clicking and locking the control lever (10) in the open position, and in turn comprising a bracket (81) fitted to the base flange (6) and having a spherical pin (82) retractable in opposition to elastic means, and an adjustable projecting element (83) fitted to the control lever (10) and which clicks onto said pin (82) when the control lever (10) is in said open position.

12. A clamping system as claimed in claim 1, characterized in that said actuating means for activating the control lever comprise a linear actuator (12) integral with the base flange (6), and a movable element (61) of which is hinged to the control lever (10) by means of a second transverse appendix (62) of the control lever (10), located substantially symmetrically and specularly with respect to the appendix (41) connecting the connecting rod (18) to the control lever (10).

13. A clamping system as claimed in claim 12, characterized in that said actuator (12) is fitted integrally to a supporting foot (85) in turn fitted integrally to the base flange (6), and pivots between a pair of facing brackets (86) fitted to either side of said supporting foot (85).

14. A clamping system as claimed in claim 13, characterized in that at least one of said brackets (86) is fitted to the supporting foot (85) in easily removable manner, by means of screws (90); and in that the actuator (12) pivots between two plates (91), each fitted to the front of a respective said bracket (86) in easily removable manner, by means of screws (95).

15. A clamping system as claimed in claim 13, characterized by also comprising said pedestal (7); the base flange (6) being fitted to the pedestal (7) by means of said supporting foot (85) in easily removable manner, by means of screws (97).

16. A clamping system as claimed in claim 15, characterized in that said pedestal (7) comprises a first (98) and a second (99) flat connecting surface strictly perpendicular to each other and for selectively receiving said supporting element (8).

17. A clamping system as claimed in claim 15, characterized in that said pedestal (7) is fitted laterally with microswitches (100) for detecting the position of the movable element (61) of said actuator (12).

* * * * *